Dec. 13, 1960 E. W. ULRICH Re. 24,906
PRESSURE-SENSITIVE ADHESIVE SHEET MATERIAL
Original Filed Aug. 14, 1958
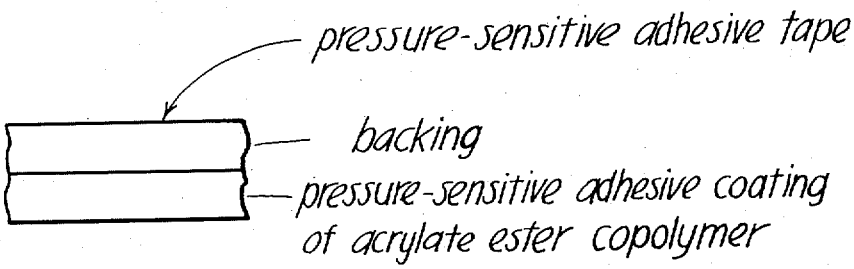
INVENTOR
ERWIN W. ULRICH
by Carpenter, Abbott, Coulter & Kinney
ATTORNEYS United States Patent Office Re. 24,906

Reissued Dec. 13, 1960

24,906

PRESSURE-SENSITIVE ADHESIVE SHEET MATERIAL

Erwin W. Ulrich, Rosemount, Minn., assignor to Minnesota Mining and Manufacturing Company, St. Paul, Minn., a corporation of Delaware Original No. 2,884,126, dated Apr. 28, 1959, Ser. No. 756,059, Aug. 14, 1958. Application for reissue May 8, 1959, Ser. No. 812,077

7 Claims. (Cl. 206—59)

Matter enclosed in heavy brackets [ ] appears in the original patent but forms no part of this reissue specification; matter printed in italics indicates the additions made by reissue.

This invention relates to flexible adhesive-coated sheet material, and particularly to pressure-sensitive adhesive sheet products, including adhesive tape.

The present application is a continuation-in-part of my copending application Ser. No. 547,844, filed on November 18, 1955, now abandoned, as a continuation-in-part of my earlier application Serial No. 303,820, filed August 11, 1952, now abandoned.

Normally tacky and pressure-sensitive adhesive-coated sheet material is well-known to industry in the form of masking tapes, transparent mending and sealing tapes, and adhesive tapes for other purposes. Typical pressure-sensitive adhesive formulas as applied to such tapes contain crude rubber and rosin or various hydrocarbon resins, the blend providing the required four-fold balance of adhesion, cohesion, stretchiness and elasticity. This same required balance of properties is obtained with certain other rubbery materials in the absence of tackifier resins and other modifying agents, certain vinyl polymers such as poly-n-butyl acrylate and polyvinyl n-butyl ether being noteworthy in this respect. These polymers are inherently pressure-sensitive.

Polyvinyl pressure-sensitive adhesives provide good adhesion to many surfaces, do not deteriorate on prolonged exposure to sunlight, are clear and colorless in appearance, and do not split or offset to the back surface of the tape as it is unwound from roll form. Pressure-sensitive tape products coated with these adhesives have proven ineffective, however, for a number of other applications such as fastening cards or pictures on vertical walls, bonding stiff paper labels to metal cans or glass jars, and sealing of kraft paper bags. The packaging of items such as rice or beans is greatly facilitated by the use of pressure-sensitive adhesive tape as a sealing medium, but tape coated with the polyvinyl pressure-sensitive adhesives of the prior art has proven inadequate for such use.

The provision of a flexible coated sheet material having a coating of polyvinyl pressure-sensitive adhesive of improved properties is therefore an object of the present invention. A specific object of the invention is the provision of a pressure-sensitive adhesive tape having an improved polyvinyl pressure-sensitive adhesive coating, more particularly a polyacrylate ester pressure-sensitive adhesive coating, capable of adherently bonding to kraft paper under very light and quick fingertip pressure as in the commercial packaging of grains or other common grocery items, and of then remaining firmly adherently bonded to the paper under the normal tension of such packages. Other objects and advantages will become apparent, or will be specifically pointed out, as the description of the invention proceeds.

Examples of vinyl polymers having inherent pressure-sensitive adhesive properties are the polymers of the acrylate esters of acrylic acid with non-tertiary alkyl alcohols such as n-butanol, n-pentanol, isopentanol, 2-methyl butanol, 1-methyl butanol, 1-methyl pentanol, 2-methyl pentanol, 3-methyl pentanol, 2-ethyl butanol, pentanol-3, 3,5,5-trimethylhexanol, heptanol-3, isooctanol, n-decanol, dodecanol, and the like, as well as various copolymers. The pressure-sensitive adhesive tapers produced therewith are useful for many purposes but are inadequate, as already pointed out, in respect to the packaging test. Such tapes do not adhere with sufficient intensity to kraft paper under light fingertip pressure. Furthermore they pull away from the paper under constant stress, even though applied with more forceful pressure. Thus they are ineffective in maintaining paper bags of rice, beans, or other commodities in closed and sealed condition. Likewise they do not adequately bond labels to metal or glass, or cards to painted walls, as already mentioned.

Each of the acrylic acid ester polymers indicated above is sticky or tacky to the touch at room temperature, and is stretchy and elastic. In most if not all cases the polymer has sufficient internal strength or cohesiveness so that when coated on a suitable flexible film or treated paper backing and wound up in roll form it will not split along a central plane, and offset to the reverse side of the adjacent convolution, when the strip is unwound from the roll. Some of the polymers of the higher alkyl acrylates may show some slight splitting, particularly at moderately elevated temperatures; but even these sticky polymers are generally useful at lower temperatures. The lower alkyl acrylate ester polymers in particular, e.g., n-butyl and isoamyl acrylate polymers, have been used effectively as pressure-sensitive adhesives for a variety of applications, even though being inadequate for more critical uses as shown by failure in the packaging test.

On the contrary, the lower alkyl methacrylate polymers, including n-butyl methacrylate and isoamyl methacrylate polymers, have been shown to be completely non-tacky at normal room temperatures and are therefore entirely ineffective as normally tacky and pressure-sensitive adhesive masses.

Surprisingly, it has now been discovered that certain non-tertiary acrylate esters, which by themselves form sticky but internally soft and weak polymers, may be copolymerized with small proportions of additive copolymerizable monomers having strongly polar groups, viz., acrylic acid, methacrylic acid, acrylamide, methacrylamide, itaconic acid, [or acrylonitrile] or mixtures thereof, to provide pressure-sensitive tape adhesive masses which in the form of pressure-sensitive adhesive coatings are high in cohesive or internal strength while still retaining a high degree of stickiness or tackiness. The tape adheres firmly to kraft paper and other surfaces under minimum fingertip pressure. Filled paper bags sealed with such tape, as in the test procedure hereinafter more particularly identified, do not later snap open, but remain closed, and labels adhered with such adhesive to tin cans or glass pars do not loosen and spring away, on prolonged storage of the sealed or labeled articles.

A typical pressure-sensitive adhesive tape structure is illustrated in cross-section in the accompanying drawing, showing a segment of a flexible backing material having on one surface thereof a pressure-sensitive adhesive coating of an acrylate ester copolymer as hereinafter described.

Example 1

The homopolymer of isoamyl acrylate is a normally tacky and pressure-sensitive adhesive which, however, is inadequate in packaging and holding properties. Two hundred and eighty-five parts by weight of isoamyl acrylate monomer was copolymerized with 15 parts of acrylic acid in solution in 700 parts of ethyl acetate solvent, using 2 parts of benzoyl peroxide as catalyst. The solution was held at 60° C. for 5 hours until polymerization was largely completed then at about 70° C. for 1 hour, to provide a viscous solution containing about 30% non-volatiles. It was diluted to 20–25% non-volatiles with heptane, to provide a spreadable viscosity of about 2500 cps., and was then coated in a thin layer on cellophane which had previously been provided with a low-adhesion backsize.

The tape was tested for packaging ability in comparison with the product similarly prepared from the homopolymer of isoamyl acrylate. Kraft paper bags filled with 2-lb. quantities of rice were closed with a single fold, and sealed with an inch-long strip of half-inch tape applied across the fold. The tape was applied with a quick stroking motion of the fingertips. The homopolymer adhesive tape was not fully adhered to the bag by such technique; in most cases it required further stroking or rubbing action for complete adherence. After standing at normal room temperature for a short time, usually less than two hours, these bags "popped" open. On the other hand, tape coated with the copolymer adhesive of this example adhered firmly and completely when first applied, and the bags remained permanently sealed.

Example 2

The acrylate ester of commercial fusel oil was copolymerized with acrylic acid in 95:5 ratio, by methods described under Example 1, and the adhesive was coated on cellophane to provide a pressure-sensitive adhesive tape having good packaging properties.

Commercial fusel oil has a variable composition lying within the approximate limits of 55–80% primary amyl alcohols, 15–45% primary butyl alcohols, and 0–5% n-propyl alcohol, as determined by analysis, and the fusel oil acrylate ester as used in this example is a mixture of the acrylic acid esters of these alcohols within the proportions given and having an average of slightly more than four carbon atoms per alcohol alkyl group. At least one-half of the carbon atoms of the alkyl groups of the ester molecules are in a straight chain terminating at the hydroxyl oxygen atom, a major proportion of such chains containing at least four carbon atoms.

The polymer of fusel oil acrylate, as well as other polymers and copolymers of the non-tertiary acrylate esters herein enumerated, and copolymers of such esters with small amounts of other esters such as the 0–5% of n-propyl acrylate in the above Example 2, or of other copolymerizable monomers as hereinafter noted, are effective pressure-sensitive adhesives for many purposes, but do not meet the more drastic requirements of the packaging test. Copolymerization of these same acrylate monomers or mixtures of monomers with small amounts of acrylic acid or equivalent copolymerizable additive monomer component results in normally tacky and pressure-sensitive adhesive polymers having the same valuable characteristics of transparency, sunlight resistance, etc. as do the unmodified corresponding acrylate ester polymers, and in addition having the ability to quickly and completely adhere to kraft paper to provide a permanent seal, as required for packaging.

Example 3

2-ethylbutyl acrylate and ethyl acrylate, copolymerized in 3:1 molar ratio to provide an average alcohol alkyl group of 5 carbon atoms, form a normally tacky and pressure-sensitive adhesive polymer which adheres to many surfaces but is deficient in packaging value. The adhesion value may be increased by the addition of resinous tackifiers, but the elastic strength of the adhesive bond is then inadequate. The same monomers when copolymerized in the same proportions but with small added amounts of acrylic acid provide a pressure-sensitive adhesive polymer which in the form of a coated adhesive tape is found to have good adhesion and good internal strength, and to be an effective packaging tape. Amounts of acrylic acid ranging from about 4% to about 8% of the total monomers are found to provide the best over-all results in terms of the pressure-sensitive adhesive tape product.

Example 4

The pressure-sensitive adhesive polymer of Example 2, produced by copolymerization of 95 parts of fusel oil acrylate and 5 parts of acrylic acid, is plasticized by the addition of one-fourth its weight of a lower molecular weight balsam-like polymer of n-butyl acrylate and coated from solution in a volatile solvent on matte finish cellulose acetate film which has been coated on the reverse side with a thin coating of a low adhesion backsize. After drying, the coated web is slit into narrow strips and wound up in convolute roll form. The tape may be unwound from the roll without splitting or offsetting of the adhesive, and is particularly effective as a packaging tape, and as a mending or sealing tape, e.g., for repairing torn papers or documents. In contrast with tapes coated with adhesives similarly prepared but containing no acrylic acid residues, the adhesive tape of this example is highly resistant to the softening effect of mineral oils, and hence is useful in impregnated electrical coils and other applications involving continued contact with oil.

The low-molecular-weight n-butyl acrylate polymer has a viscosity of about 2000 cps. at 50% concentration in heptane, measured at 25° C. Adhesive polymers such as fusel oil acrylate pressure-sensitive adhesive are very much higher in molecular weight and must be diluted to about 20% concentration in order to show a similar viscosity. The polymer of acrylic acid and fusel oil acrylate cannot be directly compared because of its comparative insolubility in heptane solvent, but is of the same general consistency as the fusel oil acrylate homopolymer adhesive.

Dibutyl or dioctyl phthalate, hydroabietyl alcohol, the methyl ester of hydrogenated abietic acid, and other equivalent compatible plasticizers may be substituted for the low-molecular-weight acrylate polymer plasticizer of Example 4 in modifying the properties of these pressure-sensitive adhesive masses, generally in amounts of not more than about one-fourth or one-third the weight of the principal polymer. Pigments, dyes, fillers, and other modifiers can also be included where desired.

Example 5

A mixture of 104 parts by weight of distilled water, 8 parts of a 28% solution of alkylated aryl polyether sodium sulfonate ("Triton X–200"), 95.5 parts of isooctyl acrylate, 4.5 parts of acrylic acid, and 0.08 part of tertiary dodecyl mercaptan was purged well with nitrogen and brought to 30° C. with agitation. There was then added 0.2 part of potassium persulfate and 0.067 part of sodium bisulfite. Polymerization proceeded rapidly with evolution of heat. The polymer was recovered from the emulsion, dried, dissolved in a mixture of 80 parts heptane and 20 parts propyl alcohol to a coatable viscosity, coated on cellophane, and dried to form a pressure-sensitive adhesive tape having superior adhesion and holding power on kraft paper.

Example 6

A mixture of 150 parts by weight of ethyl acetate, 96 parts of isooctyl acrylate, 4 parts of acrylamide, and 0.37 part of benzoyl peroxide was purged well with nitrogen and brought to 55° C. with agitation. Polymerization started after about one hour and the batch gradually thickened. An additional 0.25 part of benzoyl peroxide was added at 3–4 hours and a like quantity at 7–8 hours. Heating was continued for a further 6 hours. The mixture was then diluted with heptane to a coatable viscosity. Coated on cellophane and dried, it produced a pressure-sensitive adhesive tape having superior packaging characteristics.

Example 7

A mixture of 122 parts by weight of ethyl acetate, 95.3 parts of isooctyl acrylate, 1.4 parts of methacrylic acid, and 0.34 part of benzoyl peroxide was purged with nitrogen and brought to 55° C. with agitation. Polymerization started after about one hour, and the solution gradually increased in viscosity. During the following five hours there was added, in approximately equal fractional portions, a total of 3.3 parts of methacrylic acid, 6.5 parts of ethyl acetate, and 0.59 part of benzoyl peroxide. The mixture was then thinned with a further 39 parts of ethyl acetate, held at 55–57° C. for seven hours, and diluted with heptane to a coatable viscosity. Pressure-sensitive adhesive tape having high packaging value was prepared by coating the solution on a flexible tape backing and drying.

[Example 8]

[A reaction vessel was charged with 147 parts of distilled water, 2 parts of a 46% solution of alkyl aryl sodium sulfonate wetting agent, 94 parts of isooctyl acrylate, 6 parts of acrylonitrile, and 0.02 part of tertiary dodecyl mercaptan. After purging with nitrogen and bringing to 40° C., there was added 0.2 part of potassium persulfate and 0.067 part of sodium bisulfite. The resulting polymer was recovered in heptane solution, the water being removed by boiling in the continued presence of the heptane. The polymer, in the form of a thin coating on a flexible tape backing, exhibited high packaging value.]

Example 9

A copolymer of 97 parts by weight of isooctyl acrylate and 3 parts of methacrylamide was prepared in ethyl acetate solution by the method described in connection with Example 6. A pressure-sensitive adhesive tape product having high packaging value was produced on application of the copolymer to a suitable tape backing.

Example 10

A terpolymer was prepared in emulsion form by methods already indicated, employing 104 parts of distilled water, 7.15 parts of 28% solution of alkylated aryl polyether sodium sulfonate ("Triton X–200"), 86 parts of isooctyl acrylate, 9.5 parts of ethyl acrylate, 4.5 parts of acrylic acid, 0.057 part of carbon tetrabromide, 0.2 part of potassium persulfate, and 0.067 part of potassium bisulfite. The product was an effective pressure-sensitive tape adhesive, producing a coated adhesive tape having high packaging value.

On the contrary, a copolymer of 88 parts of isooctyl acrylate and 12 parts of methyl acrylate was found to be ineffective in the packaging test.

The polymers of the following tabulated additional examples were also produced and tested as pressure-sensitive adhesives by appropriate methods as already indicated. They were found to exhibit excellent immediate adhesion to kraft paper and to provide an effective permanent bond when tested for packaging value.

| Example | acrylate | amt. | comonomer | amt. |
|---|---|---|---|---|
| 11 | isoamyl | 92.5 | acrylic acid | 7.5 |
| 12 | isooctyl | 92 | do | 8 |
| 13 | 3,5,5-trimethylhexyl | 95 | do | 5 |
| 14 | n-decyl | 94 | do | 6 |
| 15 | dodecyl | 94 | do | 6 |
| 16 | (fusel oil) | 97 | methacrylic acid | 3 |
| 17 | 2-ethylhexyl | 95.5 | acrylamide | 4.5 |
| 18 | heptyl-3 | 96 | do | 4 |
| 19 | isooctyl | 96.3 | do | 3.7 |
| 20 | do | 96 | acrylic acid<br>acrylamide | 2<br>2 |
| 21 | (fusel oil) | 95 | itaconic acid | 5 |
| [22 | isooctyl | 94 | acrylonitrile | 6 |
| 23 | do | 94 | methacrylonitrile | 6] |
| 24 | (fusel oil) | 90 | acrylic acid | 10 |

Polymers formed of the above-identified acrylates or mixtures of acrylates in the absence of the acrylic acid or other equivalent copolymerizable monomers are sticky or tacky and in most cases come within the definition of pressure-sensitive tape adhesives. However they are deficient in the ability to adhere firmly to kraft paper when rapidly applied under light pressure, e.g., as in the sealing of paper bags. Such polymers differ among themselves in these qualities, and polymers of the same monomers may also differ depending on the method of polymerization or other factors. While copolymerization of such monomer systems with small amounts of one or more of the copolymerizable additive monomers of the examples will in each case produce distinct improvement in the qualities indicated, it is not ordinarily possible to foretell the exact amount of a particular additive which will provide with a particular principal monomer the maximum improvement in desired properties as determined by the packaging test or other equivalent analytical procedure. As shown by the examples, the preferred range of proportions of such additives is about 3–10%. Less than about 3% of the additive ordinarily does not impart worthwhile improvement. Amounts somewhat above 10 may be employed, particularly with principal monomers which by themselves form soft sticky polymers of low-internal or cohesive strength. Above about 12–15% of additive monomer, the polymer becomes too firm and hard for best application as a normally tacky pressure-sensitive adhesive.

Specific acrylic acid esters other than those named hereinabove, as well as various mixtures of esters, may equally well be employed as the principal monomers in the practice of this invention. These esters or mixtures may include methyl, ethyl, and propyl acrylates as well as longer chain acrylates including tetradecyl acrylates, and including both primary and secondary, normal and branched chain alkyl esters. Tertiary alkyl esters do not provide the required stickiness and other properties and are excluded. Highly branched alkyl chains in which the side chains account for more than about one-half the total number of carbon atoms are likewise found to produce polymers of inadequate stickiness and are also to be excluded.

It is also necessary that the acrylic acid ester component contain at least a major proportion of esters having an alkyl chain length of at least four carbon atoms, and that the total number of carbon atoms in the average alkyl group be within the range of about 4–12 carbon atoms.

A seeming exception to these requirements is the acrylic acid ester of pentanol-3. This secondary alcohol has an alkyl skeletal chain length of only three carbon atoms but provides a polymer, as well as a copolymer with small amounts of acrylic acid or the like, which is useful as a normally tacky and pressure-sensitive tape adhesive. The copolymer has highly acceptable packaging characteristics. While this ester is therefore contemplated as being an equivalent of those above-identified, it is relatively very difficult to prepare by direct esterification of the secamyl alcohol with acrylic acid and is therefore not presently preferred.

The acrylic acid non-tertiary alkyl ester monomers or mixtures as above identified will normally be copolymerized only with one or more of the additive copolymerizable monomers hereinbefore noted. Small amounts of other monomers may unavoidably be associated with these monomers, or may even be deliberately added, without detracting from the value of the resulting polymer for the purposes here under consideration. The inclusion of copolymerizable ethylenically unsaturated monomers such as the ethyl acrylate of Example 10, as well as vinyl chloride, various methacrylate esters, butadiene, isoprene, diallyl phthalate, etc., in such limited amounts as do not drastically alter the properties of the non-tertiary alkyl acrylate ester polymer, is therefore to be considered as coming within the scope of the present invention.

It is found that [the alkyl acrylates and acrylonitrile or methacrylonitrile are most effectively copolymerized in aqueous emulsion, whereas] the copolymers made with acrylamide, methacrylamide, methacrylic acid, or itaconic acid are best produced in organic solution. Acrylic acid is more versatile; it may be copolymerized with the esters in both aqueous and non-aqueous systems, and with greater ease. For most purposes, acrylic acid-acrylate ester copolymer adhesive masses are therefore greatly preferred.

The two systems of polymerization each have important advantages depending on the source of monomers, the type of backing to be coated, and various other variables. For example, monomers which contain odoriferous impurities may be polymerized in, and coated directly from, aqueous systems with substantial reduction in odor level. On the other hand, many water-sensitive backings cannot conveniently be coated with adhesive compositions from aqueous suspension. While such a composition may be converted to an organic solvent system, it is more convenient and economical to produce the polymer directly in such solvent.

The flexible backing member to which the coating of modified polyacrylate pressure-sensitive adhesive is applied may be transparent cellophane or cellulose acetate, in which case, where the adhesive is also transparent, a transparent pressure-sensitive adhesive tape is produced. Other transparent films, for example, films of ethyl cellulose, plasticized vinyl acetate-vinyl chloride copolymers, terephthalic acid-ethylene glycol polyester resins, and the like, are also effective as transparent flexible backings for use in connection with these adhesives.

For instance, a pure polymer film backing such as a nylon or a polyethylene film (free from plasticizer) coated with the present pressure-sensitive adhesive, the film being treated if desired to enhance the bonding of the adhesive to the substrate surface, provides a superior adhesive tape or sheet for surgical and medical purposes. The adhesive is relatively non-irritating to the human skin and the backing film does not include any plasticizer or other component which might otherwise migrate into the adhesive and render it irritating. This adhesive can be employed in other products useful in the surgical and medical fields, including those having cloth or nonwoven fibrous elements.

The backing member may be given a preliminary adhesive priming coat if desired, although the copolymer adhesive masses herein described are ordinarily found to become firmly adherently bonded to most backings even in the absence of such priming layer. Colored films may be substituted, and colors or pigments, or contrasting opacifiers, may be incorporated in the adhesive mass, where colored tape products are desired. Opaque films, and films coated with single or multiple layers of various other materials, may replace the transparent films.

Flexible fibrous backings may also be employed, including treated or untreated paper, cloth, wadding, and the like. Tape products which are designed primarily for package sealing, and particularly for the sealing of kraft paper bags as herein described, will ordinarily comprise cellophane or some equivalent thin, flexible and strong sheet material. However it has been found that such coated sheets or strips have advantages in connection with adhesive bonding to many surfaces other than kraft paper, and hence no limitation is to be implied with respect either to the type of flexible backing member employed or to the type of surface to which the coated product is to be adhered.

Thus the pressure-sensitive adhesive coated sheet material is found to possess an unusually desirable combination of bonding properties with regard to metal and glass surfaces. It is found, for example, that such sheet material adheres readily and firmly to clean surfaces of glass, aluminum sheet, and the like, when lightly pressed thereagainst at normal room temperatures. The sheet may then be removed by cautious stripping, and replaced, as many times as desired. With some of these adhesive compositions, adhesion to the surface is found to increase substantially when the sheet is allowed to remain adherently attached to such surfaces for even a few hours. Under these conditions, many types of adhesive-coated backings are found to be permanently bonded to the surface so that they cannot be effectively removed. The same effect is obtained on other metallic surfaces and on painted or enameled surfaces.

Where permanent adhesion of the type just described is desired, best results are normally obtained with adhesives made with a somewhat higher proportion of additive monomer such as acrylic acid than in the case of the products designed primarily for use on kraft paper or cellophane. For example, where about 3–8%, or preferably 4–6% of acrylic acid is ideal in the latter case, the use of about 6–12% is recommended for the former.

Adhesive surfaces, and particularly those which tend to form a permanent bond with another surface on prolonged contact therewith, may be protected and preserved by means of suitable low-adhesion liners or coverings, of which polyethylene or other high molecular weight waxy type materials are exemplary, either in film form or as a surface coating on paper or other supporting web. Other suitable coating materials which serve as effective low-adhesion backsizes or coatings are described in U.S. Patents Nos. 2,532,011 and 2,607,711.

What is claimed is as follows:

1. Normally tacky and pressure-sensitive adhesive coated sheet material having high packaging value and comprising a thin flexible backing member and, firmly adherently bonded thereto, a coating of a copolymer of monomers consisting essentially of (a) monomeric acrylic acid ester of non-tertiary alkyl alcohol the molecules of which have from one to 14 carbon atoms, the average being about 4–12 carbon atoms, at least a major proportion of said molecules having a carbon-to-carbon chain of at least four carbon atoms terminating at the hydroxyl oxygen atom, said chain containing at least about one-half the total number of carbon atoms in the molecule, said acrylic acid ester being further characterized as being per se polymerizable to a sticky, stretchable and elastic, adhesive polymer mass; and (b) at least one monomer copolymerizable with said acrylic acid ester and selected from the group consisting of acrylic acid, methacrylic acid, itaconic acid, acrylamide, *and* methacrylamide[, acrylonitrile, and methacrylonitrile] in an amount by weight within the range of about 3–12 percent of the total of said monomers (a) and (b), said monomers and the proportions thereof being further selected to provide a normally tacky and pressure-sensitive adhesive copolymer.

2. A convolutely wound roll of the normally tacky and pressure-sensitive adhesive coated sheet material of claim 1 in narrow continuous tape form and capable of being unwound from said roll without splitting and offsetting of the adhesive copolymer coating.

3. A convolutely wound roll of the normally tacky and pressure-sensitive adhesive coated sheet material of claim 1, said sheet material being provided with a low-adhesion back-size coating on the adhesive-free major surface, said sheet material being in narrow continuous tape form and being capable of being unwound from said roll without splitting and offsetting of the adhesive copolymer coating.

4. Coated sheet material comprising a flexible backing and, firmly adherently bonded thereto, a coating of a copolymer of monomers consisting essentially of (a) monomeric acrylic acid ester of non-tertiary alkyl alcohol the molecules of which have from 1 to fourteen carbon atoms, the average being about 4–12 carbon atoms, at least a major proportion of said molecules having a carbon-to-carbon chain of at least four carbon atoms terminating at the hydroxyl oxygen atom, said chain containing at least about one-half the total number of carbon atoms in the molecule, said acrylic acid ester being further characterized as being per se polymerizable to a sticky, stretchable and elastic, adhesive polymer mass, and (b) acrylic acid in an amount by weight within the range of about 3–12 percent of the total of said (a) and (b); said monomers and the proportions thereof being further selected to provide a normally tacky and pressure-sensitive adhesive copolymer.

5. Normally tacky and pressure-sensitive adhesive coated sheet material having high packaging value and comprising a thin flexible backing member and, firmly adherently bonded thereto, a coating of a normally tacky and pressure-sensitive adhesive copolymer of monomers consisting essentially of about 92–96 parts by weight of isooctyl acrylate and correspondingly about 8–4 parts of acrylic acid.

6. Coated sheet material comprising a flexible backing and, firmly adherently bonded thereto, a coating of a copolymer of monomers consisting essentially of (a) monomeric acrylic acid ester of non-tertiary alkyl alcohol the molecules of which have from 1 to 14 carbon atoms, the average being about 4–12 carbon atoms, at least a major proportion of said molecules having a carbon-to-carbon chain of at least four carbon atoms terminating at the hydroxyl oxygen atom, said chain containing at least about one-half the total number of carbon atoms in the molecule, said acrylic acid ester being further characterized as being per se polymerizable to a sticky, stretchable and elastic, adhesive polymer mass, and (b) acrylamide in an amount by weight within the range of about 3–12 percent of the total of said (a) and (b); said monomers and the proportions thereof being further selected to provide a normally tacky and pressure-sensitive adhesive copolymer.

7. Normally tacky and pressure-sensitive adhesive coated sheet material having high packaging value and comprising a thin flexible backing member and, firmly adherently bonded thereto, a coating of a normally tacky and pressure-sensitive adhesive copolymer of monomers consisting essentially of about 94–97 parts by weight of isooctyl acrylate and correspondingly about 6–3 parts of acrylamide.

References Cited in the file of this patent or the original patent

UNITED STATES PATENTS

| | | |
|---|---|---|
| 2,147,154 | Fikentscher et al. | Feb. 14, 1939 |
| 2,464,826 | Neher | Mar. 22, 1949 |
| 2,544,692 | Kugler et al. | Mar. 13, 1951 |
| 2,557,266 | Dittmar | June 19, 1951 |
| 2,570,253 | Lundquest | Oct. 9, 1951 |
| 2,601,016 | Hendricks et al. | June 17, 1952 |
| 2,607,711 | Hendricks | Aug. 19, 1952 |
| 2,649,439 | Brown | Aug. 18, 1953 |
| 2,726,230 | Carlson | Dec. 6, 1955 |
| 2,754,280 | Brown et al. | July 10, 1956 |

FOREIGN PATENTS

| | | |
|---|---|---|
| 584,857 | Great Britain | Jan. 24, 1947 |

OTHER REFERENCES

Schillknecht: Vinyl and Related Polymers, chapter V, Wiley, New York, 1952 (pp. 256–322).